Aug. 15, 1950   R. Q. ARMINGTON ET AL   2,518,742
STABILIZING DEVICE FOR ARTICULATED VEHICLES
Filed Aug. 17, 1946   3 Sheets-Sheet 1

INVENTORS
RAYMOND Q. ARMINGTON &
WALTER F. DOUBLE
BY
*Hyde, Meyer, Baldwin & Doran*
ATTORNEYS Aug. 15, 1950     R. Q. ARMINGTON ET AL     2,518,742
STABILIZING DEVICE FOR ARTICULATED VEHICLES
Filed Aug. 17, 1946     3 Sheets-Sheet 2

INVENTORS
RAYMOND Q. ARMINGTON &
WALTER F. DOUBLE
BY
*Hyde, Meyer, Baldwin & Doran*
ATTORNEYS Aug. 15, 1950   R. Q. ARMINGTON ET AL   2,518,742
STABILIZING DEVICE FOR ARTICULATED VEHICLES
Filed Aug. 17, 1946   3 Sheets-Sheet 3

INVENTORS
RAYMOND Q. ARMINGTON &
WALTER F. DOUBLE
BY Hyde, Meyer, Baldwin & Loren
ATTORNEYS Patented Aug. 15, 1950

2,518,742

UNITED STATES PATENT OFFICE 2,518,742

STABILIZING DEVICE FOR ARTICULATED VEHICLES

Raymond Q. Armington, Shaker Heights, and Walter F. Double, Wickliffe, Ohio, assignors to The Euclid Road Machinery Co., Euclid, Ohio, a corporation of Ohio Application August 17, 1946, Serial No. 691,354

8 Claims. (Cl. 280—33)

This invention relates to improvements in a stabilizing device for tractors having tandem axles.

An object of the present invention is to provide in the combination of a tractor and trailer drawn thereby, means for permitting relatively unrestricted movement of the tractor wheels and axles when traveling in a more or less straight line over rough ground; but which reduces movement of the tractor nose up and down, a motion known as pitching, when the tractor is turned at an angle to the trailer.

A further object of the invention is to prevent the nose of an overhung tractor from dropping down toward the ground when the tractor is turned at right angles to its associated trailer about a hitch axis.

A further object of the invention is found in the combination of parallel tandem axles carried by rocker beams which oscillate about a central trunnion, wherein means is provided to limit the oscillation of the tandem axles about the trunnion pivot point when the tractor is traveling over rough ground.

In one form of the invention, means is provided whereby the limit of the pitching action of the tractor is less when the tractor and trailer are moving in a straight line, and the limiting action is gradually modified as the tractor assumes an angle to the trailer. In another form of the invention, a rough limitation upon the pitching of the tractor is provided without the graduated action of the first form.

Other objects and advantages of the present invention will be apparent from the accompanying drawings and description, and the essential features will be summarized in the appended claims.

In the drawings,

Fig. 7 is a sectional view taken along the line 7—7 of Fig. 6; while

Figure 1:
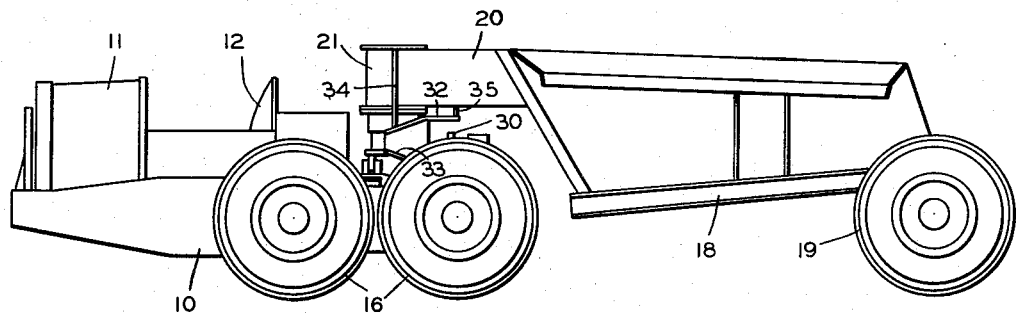
Fig. 1 is a side elevational view of a tractor-trailer device embodying our invention.

In Fig. 1 we have shown a tractor 10 having mounted at its forward end an engine 11 which is driven and controlled from a driver's seat 12. The rear end of the tractor is supported by a tandem axle arrangement which is more fully disclosed and claimed in the copending application of Raymond Q. Armington, Serial No. 610,611, filed August 13, 1945, now Patent No. 2,422,460 issued June 17, 1947, to which reference may be had for a more complete description if necessary. Suffice it to say here that on each side of the tractor a rocker beam 13 is provided a trunnion mounting at 14 on extensions of an axle housing 15 fixed to the frame of the tractor 10. A pair of wheels 16 are rotatably mounted on stub axles 17, one near each end of each rocker beam 13. Means, not shown, is provided whereby the tractor drives the wheels 16. In the copending application there is shown a tractor propeller shaft which drives floating axles inside the housing 15, and each of these floating axles drives a double sprocket in the center of one of the rocker beams 13 from which chains lead back to axles in the stub axle housing 17 whereby the wheels 16 are driven.

In Fig. 1 we have shown the trailer as consisting of a bottom dump wagon 18, but this is shown merely as an illustration, and by no means as a limitation upon our invention, as obviously, other types of trailer vehicles would operate in the same manner. The support for the trailer is by way of a pair of rear wheels 19, a front drawbar 20 and a hitch device 21. This hitch device comprises an inner sleeve 21a attached to the tractor, and an outer sleeve 21b attached to the trailer and rotatable about the inner sleeve. The means for attaching the inner sleeve 21a to the tractor comprises a base plate 22, carrying downwardly extending eyes 23 which are pivotally secured by pins 24 to upstanding ears 25 which are rigid with the frame of the tractor. The outer sleeve 21b is rigidly connected with the drawbar 20.

The stabilizing device comprises a stabilizer bar 26 connected between the rear ends of the rocker beams 13 in such a manner as to permit relative up and down movement between these rocker beams. In the form shown, one end of this bar is held beneath a strap 27 which is welded or otherwise secured to one of the rocker beams, while the opposite end of the bar is pivotally connected by the horizontally extending pivot pins 28 to the rear end of the other rocker beam. In approximately the center of the stabilizer bar there is rigidly fixed a bracket 29 converging upwardly from the bar to an upper point where a roller 30 is pivotally supported on stub shaft 31 mounted in the bracket.

Means on the trailer is provided to coact with the roller 30 so as to permit relatively free movement of the roller 30 and the stabilizer bar in an up and down direction when the tractor and trailer are in fore-and-aft alinement. This means is so constructed and arranged as to provide less of this relative movement between the roller 30 and the control means therefor on the trailer when the tractor and trailer are turned at an angle to each other as when negotiating a curve or turning around.

Figure 3:
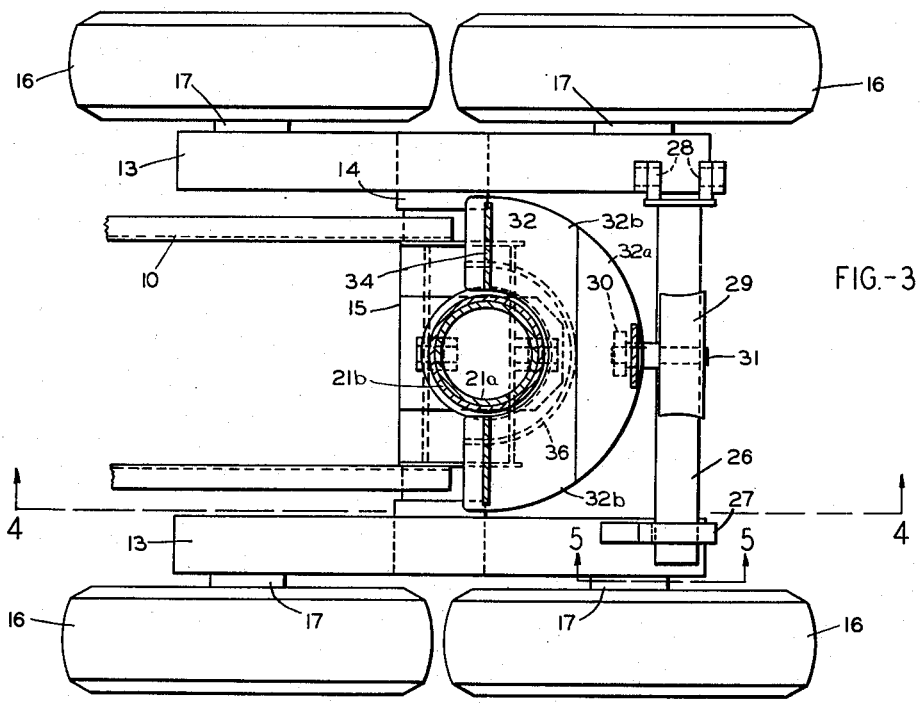
Fig. 3 is a top plan view taken along the line 3—3 of Fig. 4.

The above means coacting with the roller 30 is here shown as comprising upper and lower guide plates 32 and 33 respectively, which are substantially semi-circular in projected plan view as seen in Fig. 3. Each of these plates has a flat horizontal rear portion 32a and 33a and the forward portions converge toward each other, namely, the portion 32b inclined downwardly, and the portion 33b inclined upwardly. The upper plate 32 is rigidly connected with the outer sleeve 21b and the drawbar 20 by means of welding at the various points of contact and by means of the triangular shaped gusset plates 34, as well as by means of the brace 35 welded directly to the under side of the drawbar. The lower plate 33 is rigidly connected with the upper one by means of a semi-cylindrical plate 36 which is welded top and bottom to the plates 32 and 33 respectively. This plate 36 is located at a shorter radius from the vertical axis of the hitch 21 than is the roller 30 so that as relative turning movement occurs between the tractor and trailer the roller 30 may move freely outside of plate 36 and between the plates 32 and 33.

Figure 2:
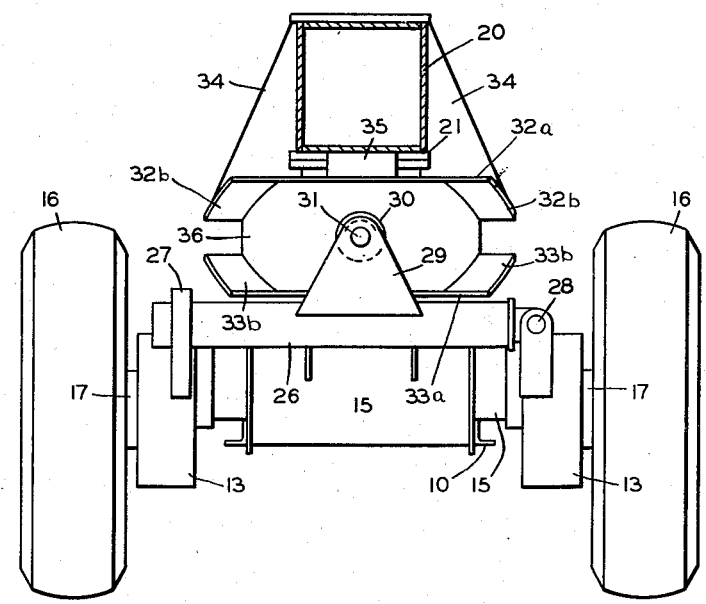
Fig. 2 is an end sectional view taken along the line 2—2 of Fig. 4.
Figure 5:
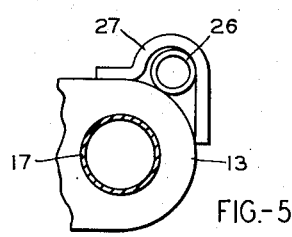
Fig. 5 is a fragmental sectional view taken along the line 5—5 of Fig. 3.
Figure 4:
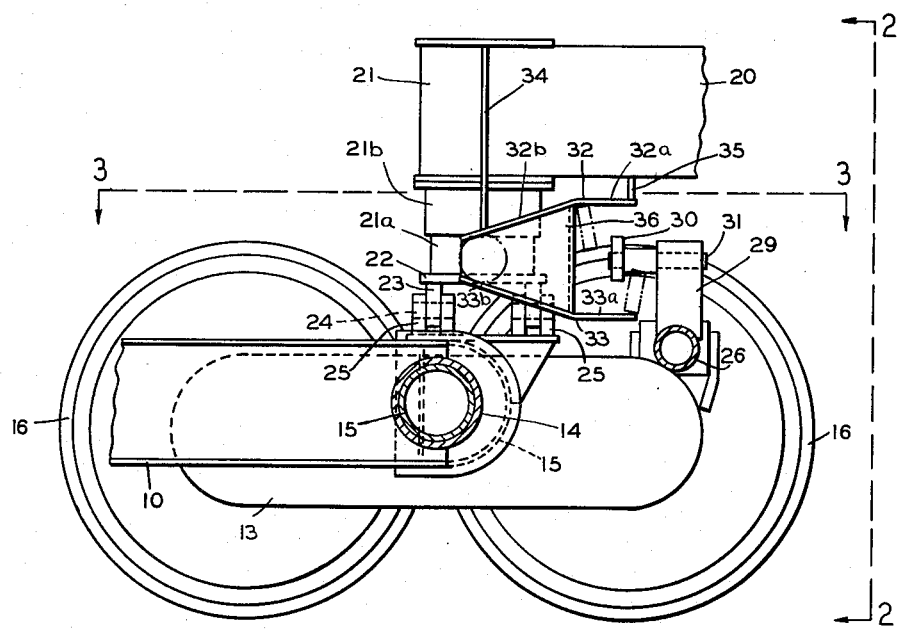
Fig. 4 is a sectional view taken along the line 4—4 of Fig. 3.

As seen in Figs. 2 and 3 and in full lines in Fig. 4, the roller 30 is approximately midway between the plate portions 32a and 33a when the tractor and trailer are in fore-and-aft alinement so that under such conditions considerable movement of the stabilizer bar in an up and down direction is possible without any limitation of the roller 30 striking plate portion 32a or 33a. However, on extreme relative movement between opposite ends of stabilizer bar 26 or upon extreme tendency of the nose of the tractor to travel upward or downward, the roller 30 may arrive at the limiting upper and lower positions indicated in dash-dot-dot-dash lines in Fig. 4.

Obviously, as relative turning movement occurs between the tractor and trailer about the vertical axis of the hitch 21, the roller 30 will move relative to the plates 32 and 33 so that as it comes opposite the sloping portions 32b (on either side) the movement of roller 30 in an up and down direction is more and more restricted as the plate portions 32b and 33b converge. If desired, the plates may so converge, as shown in Fig. 4, that when roller 30 reaches the dot-dash position of Fig. 4 all, or substantially all movement of this roller in an up and down direction is prevented. When the tractor and trailer are at an angle to each other and the movement of roller 30 is restricted by engagement with either plate 32 or 33, at such times, the rear end of one of the rocker beams 13 will be prevented from moving farther in one direction by engagement of roller 30 with one of the plates 32 or 33. Prior to such engagement, the forward end of the tractor has been oscillating about the trunnion 14. After such engagement, the tractor must oscillate about the axle of the forward wheel 16. The effect of this restriction of our improved stabilizing device is to shift the pivoting axis ahead which, of course, stabilizes the tractor.

When the tractor is turned at substantially right angles to the trailer about the hitch 21 and the roller 30 reaches the dot-dash position of Fig. 4, there would be a tendency for the heavy nose of the tractor to fall down to the ground if it were not for the holding of the roller 30 between the plates 32 and 33. Prior devices known to us have prevented the movement of the tractor to this right angle position relative to the trailer in order to preserve the stability of the tractor. With our device this is unnecessary and we are thus enabled to turn the tractor-trailer combination in a very short turning radius.

Figure 6:
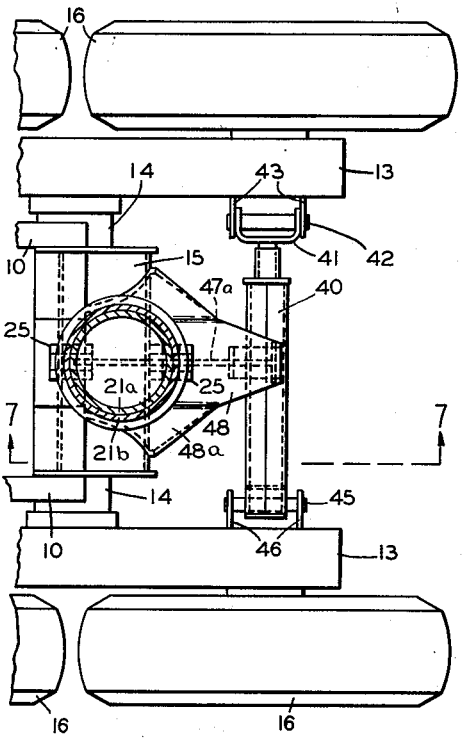
Fig. 6 is a top plan view of a modified form of our device taken along the line 6—6 of Fig. 7.
Figure 7:
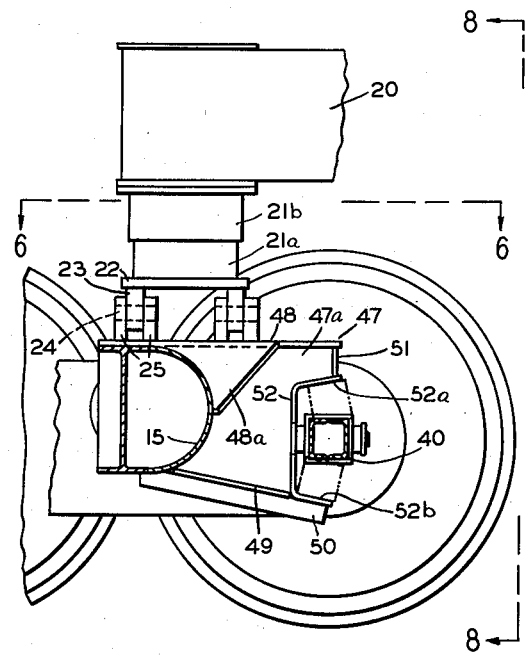
Figure 8:
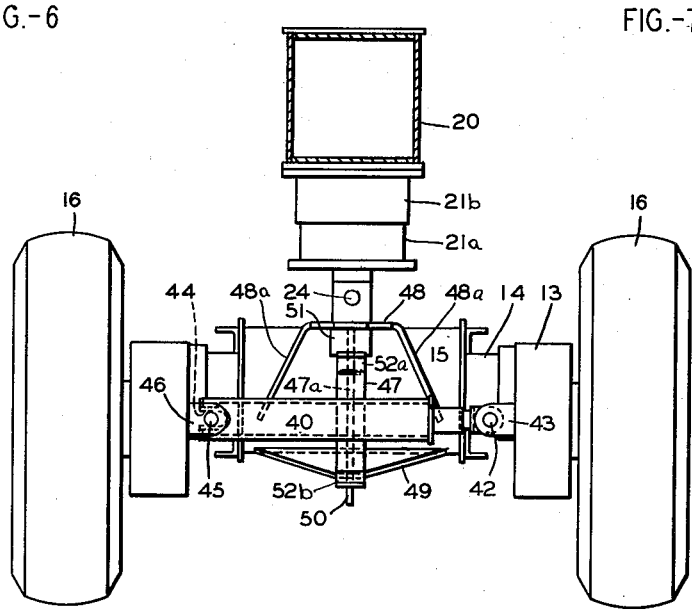
Fig. 8 is a rear elevational view taken along the line 8—8 of Fig. 7.

In the modification shown in Figs. 6, 7 and 8, the device is cheaper to construct and does a satisfactory job of limiting the pitching of the tractor when moving over rough ground. This form does not provide the modified control of the pitching action which is represented by the plates 32b and 33b of the first form. It is therefore unnecessary in this modified form to mount the control surfaces on the trailer 20. Instead, the control surfaces in this modification are carried directly on the tractor. Parts which are formed the same as in the first modification are given similar reference characters, and description will be given only of those parts which differ from the first described form.

The frame 10 carries the axle housing 15 which has trunnions 14 providing a pivotal mounting for the rocker beams 13. At the front and rear end of each rocker beam is carried a drive wheel 16 which are driven by the axle in the manner explained in connection with the first described form. Here the stabilizer bar 40 is of hollow square section having one end pivotally mounted by means of clevis 41 and pin 42 on a bracket 43 connected to the rear end of one of the rocker beams. The other end of the stabilizer bar provides a slotted opening 44 which embraces a pin 45 carried by bracket means 46 on the other rocker beam. This permits relative vertical movement between the opposite ends of the stabilizer bar when the tractor goes over rough ground.

The control surfaces for the stabilizer bar are provided on a tongue 47 which extends rearwardly from the tractor frame and is rigid therewith. This tongue comprises a vertical web 47a which is welded to a top plate 48 which has side wings 48a extending around the axle housing 15 and welded thereto. The lower end of plate 47a is braced by a bottom plate 49 which is welded to the axle housing and the center of the plate 49 is stiffened by means of a rib 50. To the rear end of plate 47a are welded a short vertical plate 51 and a U-shaped plate 52. The plate 52 has a leg 52a flared upwardly to provide the upper control surface for the stabilizer bar. The other leg 52b of plate 52 is flared downwardly to provide a lower control surface.

It is believed the operation of the second form of our device will now be apparent. Whatever the position of the tractor relative to the trailer, the stabilizer bar 40 will rest approximately in the full line position of Fig. 7 when the vehicle is on level ground. When the tractor pitches because of oscillation of one or both of the rocker beams 13, the stabilizer bar will be carried either upwardly or downwardly, the limit to such movement being the upper and lower dot-dash positions indicated in Fig. 7. When the stabilizer bar engages either the surface 52a or 52b, further oscillation of the rocker beams about the trunnions 14 becomes impossible and the device oscillates about the forward wheels 16. This reduces the pitching and stabilizes the action of the overhung tractor 10. In the case of this second modification, the stabilizing action is the same whether the tractor is in alinement with the trailer or turned at an angle thereto, because the control surfaces 52a and 52b always turn with the tractor. In actual practice, this provides sufficient stabilizing action to give a very satisfactory vehicular action.

In both of the above described modifications, we have shown a stabilizing bar for limiting the oscillation of the rocker beams at the rear ends thereof solely because that location has appeared to us to be the most desirable. We realize, however, that the means for limiting the oscillation of the tandem axles about their normal center of oscillation might be placed nearer the front tandem axle or at some intermediate point. It will be understood by those skilled in this art that our invention is aimed to include any similar means for limiting the oscillation of the tandem axles about the normal center of oscillation when a predetermined limit has been reached so that thereafter, the vehicle frame oscillates about one of the wheel means, thus giving a stabilizing action to the vehicle and limiting the pitching action.

What we claim is:

1. In combination, a tractor frame, two rocker beams each having a central pivotal mounting one on each side of said frame toward the rear end thereof, a pair of wheels carried by each rocker beam, one wheel forward of and one wheel rearward of said pivotal mounting, a stabilizer bar connected between the rear ends of said rocker beams in a manner permitting relative up and down movement between said beams, a trailer hitched to said tractor for oscillation relative thereto about a generally vertical axis, coacting means on said bar and on said trailer permitting greater relative movement in an up and down direction between said bar and trailer when said tractor and trailer are in fore-and-aft alinement, and said coacting means having cooperative parts permitting lesser relative movement in an up and down direction between said bar and trailer when said tractor is turned relative to said trailer about said vertical axis.

2. In combination, a tractor frame, two rocker beams each having a central pivotal mounting one on each side of said frame toward the read end thereof, a pair of wheels carried by each rocker beam, one wheel forward of and one wheel rearward of said pivotal mounting, a stabilizer bar connected between the rear ends of said rocker beams in a manner permitting relative up and down movement between said beams, a trailer hitched to said tractor for oscillation relative thereto about a generally vertical axis, coacting means on said bar and on said trailer permitting greater relative movement in an up and down direction between said bar and trailer when said tractor and trailer are in fore-and-aft alinement, and said coacting means having cooperative parts permitting substantially no relative movement in an up and down direction between said bar and trailer when said tractor is turned relative to said trailer about said vertical axis.

3. In combination, a tractor frame, two rocker beams each having a central pivotal mounting one on each side of said frame toward the rear end thereof, a pair of wheels carried by each rocker beam, one wheel forward of and one wheel rearward of said pivotal mounting, a stabilizer bar connected between the rear ends of said rocker beams in a manner permitting relative up and down movement between said beams, a trailer hitched to said tractor for oscillation relative thereto about a generally vertical axis, a roller rotatably mounted in the mid portion of said bar, cam surfaces rigid with said trailer and lying above and below said roller when said tractor and trailer are in fore-and-aft alinement and when said tractor is turned relative to said trailer, and said cam surfaces being more widely separated at the point where they register with said roller when said tractor and trailer are in fore-and-aft alinement.

4. The combination of claim 3 wherein said cam surfaces so converge as to substantially engage said roller above and below the same when said tractor is turned at approximately right angles to said trailer.

5. In combination, a tractor frame, two rocker beams each having a central pivotal mounting one on each side of said frame toward the rear end thereof, a pair of wheels carried by each rocker beam, one wheel forward of and one wheel rearward of said pivotal mounting, a stabilizer bar connected between the rear ends of said rocker beams in a manner permitting relative up and down movement between said beams, and means limiting the movement of said stabilizer bar in an up-and-down direction.

6. In combination, a tractor frame, two rocker beams each having a central pivotal mounting one on each side of said frame toward the rear end thereof, a pair of wheels carried by each rocker beam, one wheel forward of and one wheel rearward of said pivotal mounting, a stabilizer bar connected between the rear ends of said rocker beams in a manner permitting relative up and down movement between said beams, a trailer hitched to said tractor, and means carried by said trailer for limiting the movement of said stabilizer bar in an up-and-down direction.

7. In combination, a tractor frame, two rocker beams each having a central pivotal mounting one on each side of said frame toward the rear end thereof, a pair of wheels carried by each rocker beam, one wheel forward of and one wheel rearward of said pivotal mounting, a stabilizer bar connected between the rear ends of said rocker beams in a manner permitting relative up and down movement between said beams, a trailer hitched to said tractor, and means carried by one of said vehicles for limiting the movement of said stabilizer bar in an up-and-down direction, said last named means having parts for limiting bar movement more when said tractor and trailer are at an angle and other parts for limiting bar movement less when said tractor and trailer are alined.

8. In combination, a vehicle having a frame, two rocker beams each having a central pivotal mounting one on each side of said frame, said pivotal mountings being axially alined, traction devices carried by said beams, a stabilizer bar connected between the ends of said rocker beams on the same side of said pivotal mountings, said bar and beam connections being so constructed and arranged as to permit relative up-and-down movement between said beams, and stop means on said vehicle limiting the movement of said stabilizer bar in an up-and-down direction.

RAYMOND Q. ARMINGTON.
WALTER F. DOUBLE.

REFERENCES CITED

The following references are of record in the file of this patent:

UNITED STATES PATENTS

| Number | Name | Date |
| --- | --- | --- |
| 2,124,149 | Redhead | July 19, 1938 |
| 2,219,533 | Ross | Oct. 29, 1940 |
| 2,265,986 | Allin | Dec. 16, 1941 |
| 2,370,988 | Neal | Mar. 6, 1945 |
| 2,400,522 | Lantz | May 21, 1946 |